United States Patent [19]

Kelso et al.

[11] 3,900,140

[45] Aug. 19, 1975

[54] ROTATABLE CARRYING APPARATUS FOR VIDEO TAPE CAMERAS AND SIMILAR ITEMS

[75] Inventors: David Allen Kelso, North Bennington; Robert James Howe, Bennington, both of Vt.

[73] Assignee: K & H Products, Ltd., Bennington, Vt.

[22] Filed: Apr. 2, 1974

[21] Appl. No.: 457,237

[52] U.S. Cl. .................................. 224/5 V; 350/72

[51] Int. Cl. .......................................... A45c 11/00

[58] Field of Search ........... 224/5 V, 5 R, 5 A, 5 B, 224/5 H, 5 BC, 25 A, 25 R; 240/59; 354/293; 179/157; 325/16, 361, 111, 118; 350/248, 72, 198, 301; 351/38

[56] References Cited

UNITED STATES PATENTS

| | | | |
|---|---|---|---|
| 1,001,759 | 8/1911 | Hoogner | 350/298 |
| 1,018,771 | 2/1912 | Neuburger | 350/72 |
| 2,015,869 | 10/1935 | Pulz | 350/72 |
| 2,541,042 | 2/1951 | Curtis | 325/361 |
| 2,676,207 | 4/1954 | Hunt | 179/1 |
| 3,030,109 | 4/1962 | Albitz | 224/5 R |
| 3,767,095 | 10/1973 | Jones | 224/5 |

FOREIGN PATENTS OR APPLICATIONS

| | | | |
|---|---|---|---|
| 656,779 | 1/1963 | Canada | 350/72 |
| 54,783 | 7/1921 | Sweden | 224/5 B |

*Primary Examiner*—Robert J. Spar
*Assistant Examiner*—Kenneth Noland
*Attorney, Agent, or Firm*—Haynes N. Johnson, Esq.

[57] ABSTRACT

A video camera and tape recorder carrying unit is provided which rotatably secures the camera unit to a back support by a cantilevered arm. The arm passes from the frame over the head to a camera mounting base, enabling the camera to be supported in front of the user, but able to be swung to one side when not in use. Tape recording or accessory equipment is removably mounted on the same support permitting the equipment to be used in conjunction with the camera. Use of this system results in better balance, because of the central location of the center of gravity.

5 Claims, 6 Drawing Figures

ROTATABLE CARRYING APPARATUS FOR VIDEO TAPE CAMERAS AND SIMILAR ITEMS

BACKGROUND OF THE INVENTION

Due to weight, hand support for a video tape camera or movie camera can quickly be tiring. Yet, for the sake of mobility, there are occasions when the use of a tripod for support is not feasible. Similarly, tape recording sound and accessory equipment used with the camera is usually carried in a carrying case with a shoulder strap. This requires removal of the tape deck from the carrying case for reloading.

Various devices have been designed to help support a heavy camera. Unfortunately, these devices generally are chest or shoulder mounted in front of the user and often make it difficult to move the camera to one side and out of the way when it is not actually being used. They also get in the way of the user's hands in the event he wishes to take notes or engage in other activities. Examples of such structures are found in the following U.S. Pat. Nos.: Burnham 2,603,134; Klumpp 2,711,122; Beard, 2,746,369; Fauser 3,332,593; Burkins 3,507,424; Walters 3,661,308; and Jones 3,767,095. Other non-camera carrying devices noted are Hunt 2,676,207 and Jackson 3,734,367.

It should be noted that the prior art patents showing camera supports have the camera supported from below, rather than above or around the head of the user. This results in poor balance.

SUMMARY OF THE INVENTION

This invention is essentially a camera and recorder mounting system utilizing the portable features of a contoured back frame support and a cantilevered arm that serves as a camera support and a back frame to support the camera and recorder. Yet, it has virtually none of the drawbacks formerly encountered.

The system consists of a back support, a camera supporting arm, a video tape recorder mounting bracket on the back, and means for securing the back to the wearer.

The back could, typically, be the type of frame used for carrying a back pack for camping. This frame is usually a tubular metallic frame, contoured to fit the body, and having shoulder straps and a waist-securing belt. Except for necessary modifications, set forth below, a standard, commercially-available frame may be used.

The camera-supporting arm is, preferably, an arcuate shaped piece of tubular metal, such as steel or aluminum alloy, which at its rear end is mounted on the frame so that it may pivot about a substantially vertical axis. This can be most readily accomplished by having the arm of such diameter that it will telescope into or around the end of a vertical tube of the frame. The arm is dimensioned and curved so that it passes over the head and in front of the face of the user. Its front forward end has a platform to which the camera is secured. This platform may be adjustable.

In addition, means are provided on the back for securing the tape recorder (in removable fashion), such as with the use of studs and key slots.

The entire unit should be so dimensioned as to have its center of gravity (i.e. point of balance) located within or above the user's body (especially when the camera and recorder are attached). In this way, the unit balances upon the wearer and, so, is easier to carry and use.

In use, the camera is mounted on the support arm; the tape recorder is mounted on the frame; and the two are interconnected with the usual electrical lead. The user then puts the frame on and adjusts the straps and belts for positioning and balance; and the camera will then be positioned properly for use. The arm serves to support the weight of the camera, and, in fact, can even serve to hold the camera while in operation, leaving the operator's hands free to take notes. In the usual operation, however, the user may prefer to hold the camera to be certain that it is pointed properly. During periods of non-use, the carrying arm can be swung to one side to get the camera out of the vision of the operator, leaving him free to do other things. Similarly, the tape reels may be replaced in the tape recorder while it is mounted on the back frame.

DETAILED DESCRIPTION OF THE INVENTION

The invention is shown in the attached drawings in which.

Figure 1:
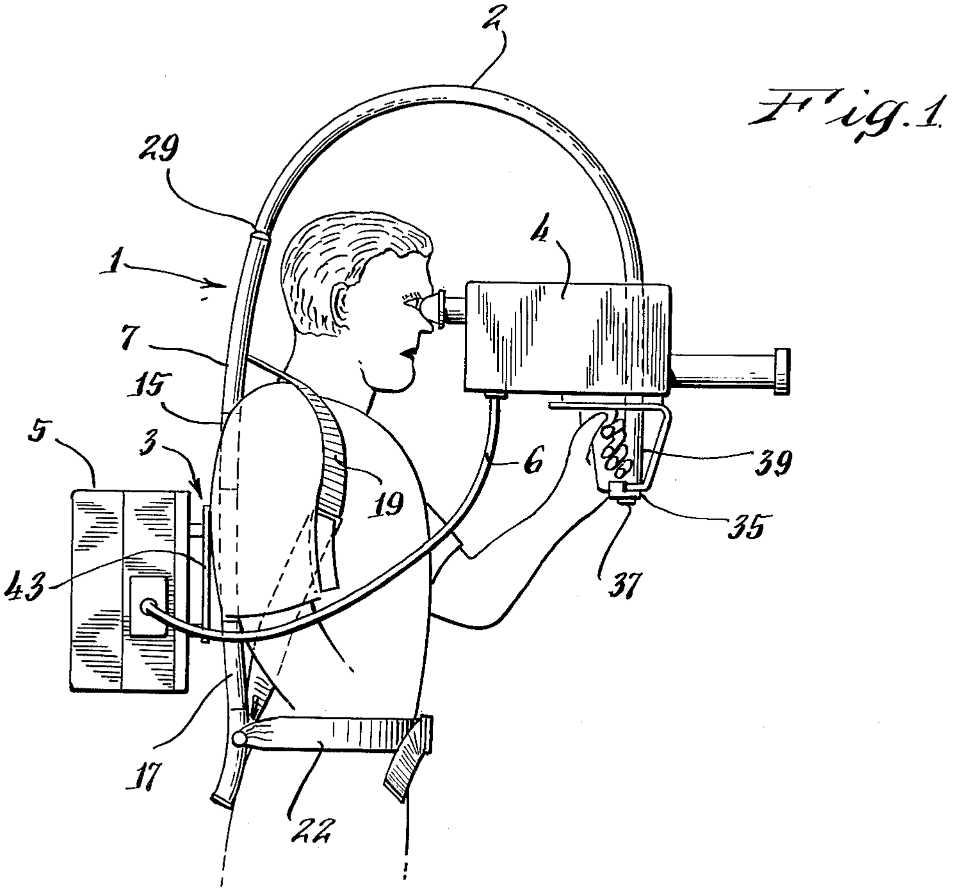
FIG. 1 is a perspective view showing a man using the supporting system to carry a video tape camera and video tape recorder.
Figure 5:
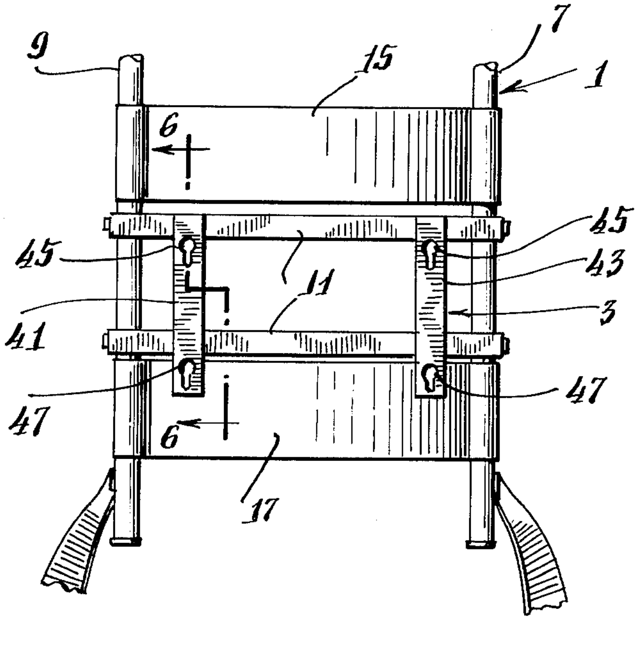
FIG. 5 is a view of a portion of the back of the structure showing one method of securing the video tape recorder to the frame.
Figure 6:
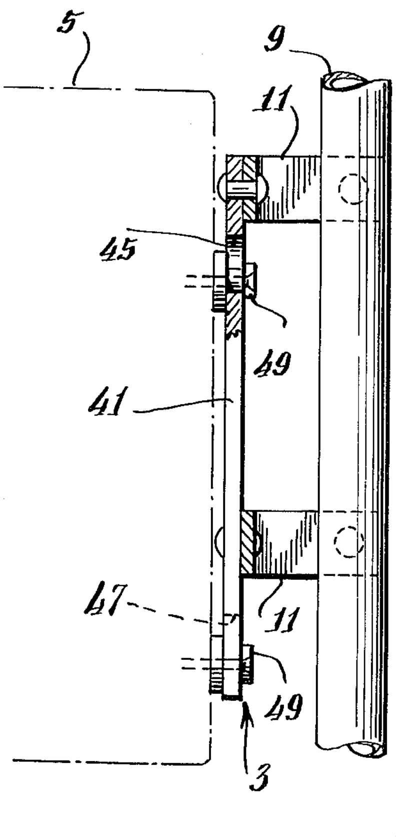
FIG. 6 is a section taken on line 6—6 of FIG. 5 showing the means by which the tape recorder is attached to the frame.
Figure 2:
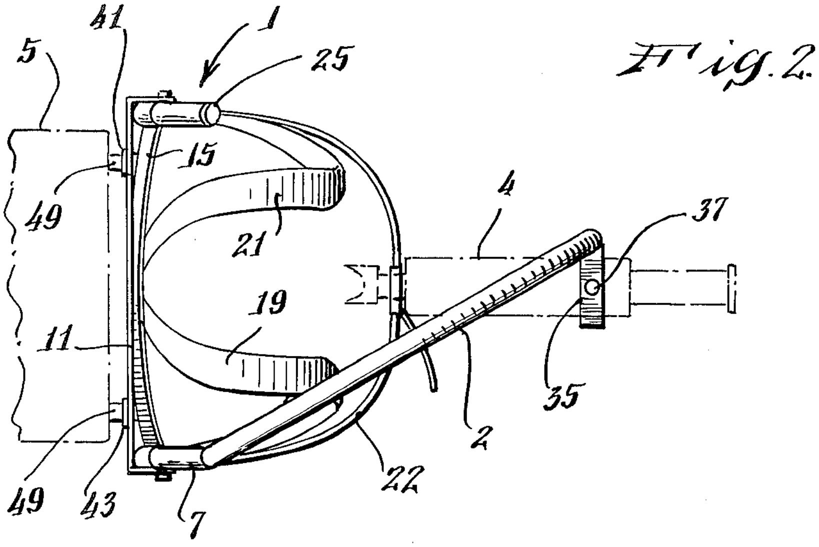
FIG. 2 is a plan view from above of the supporting structure.

As illustrated by the figures, and in particular FIG. 1, the carrying structure includes, in its principal parts, a back frame 1, a cantilevered arm 2, and means for securing the tape recorder 3. The camera is shown by the numeral 4; the tape recorder by the numeral 5; and the lead wire between the camera and the tape recorder by the numeral 6.

Frame 1 is, for the most part, of the usual type back frame structure such as is used for carrying back packs for camping and the like. It includes upright metallic tubular sections 7 and 9, metallic crosspieces interconnecting them, 11 and 13, webbing 15 and 17 running between upright sections 7 and 9 to rest against the wearer's back, and the customary shoulder straps 19 and 21. The frame should also have a belt 22 secured to the lower ends of vertical supports 7 and 9.

The frame has been modified in two respects, to telescopically and pivotally hold arm 2 and to provide for carrying bracket 3 for the tape recorder.

Figures 3, 4:
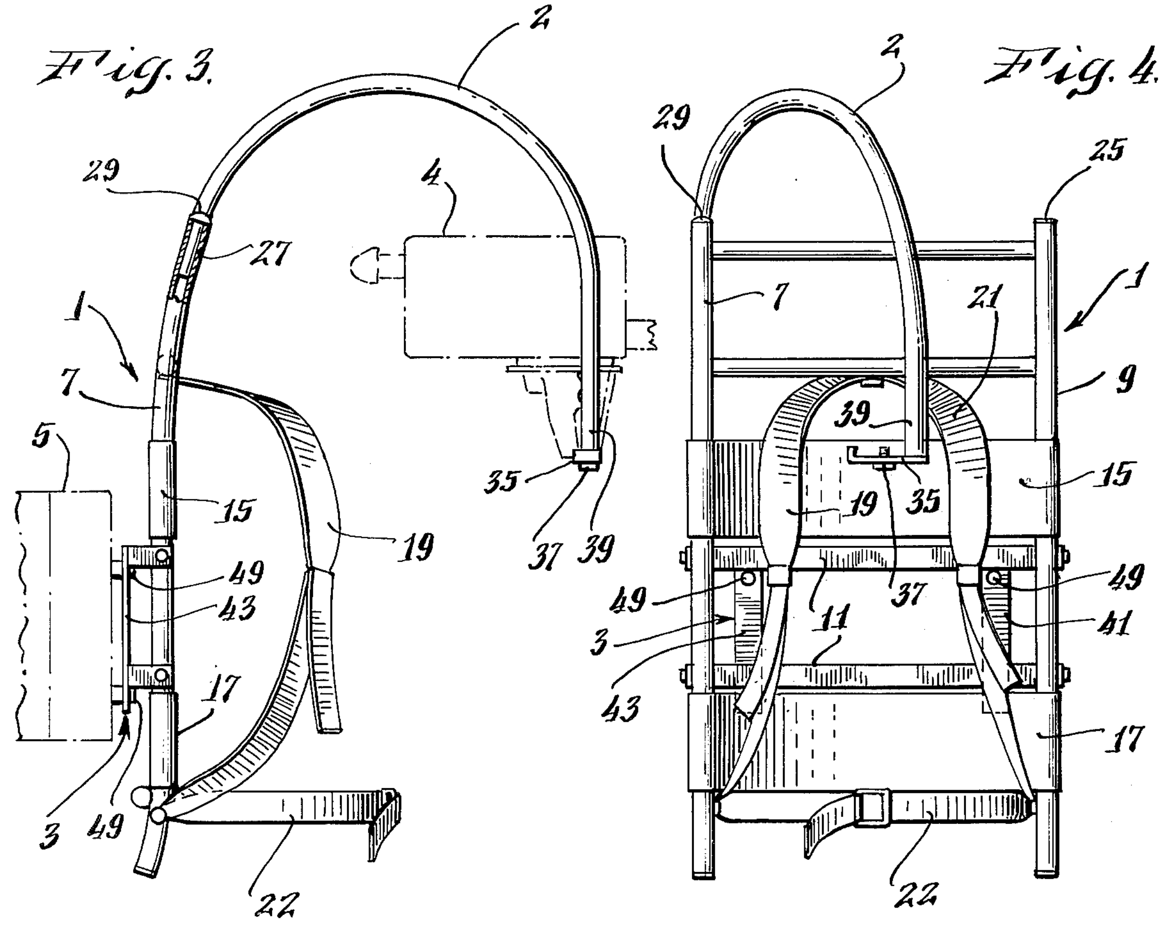
FIG. 3 is a side view of the structure.
FIG. 4 is a view from the front.

Normally in a back pack frame the upright tubular supports are capped at the top, such as is illustrated by cap 25 at the top of tubular support 9. In the present instance, the cap is removed from the top of tube 7 so that arm 2, likewise made of tubular material, may be inserted inside tube 7. This may be done by reducing the diameter of tube 2 for the portion in which it is inside tube 7 (see the slightly broken away view marked 27 in FIG. 3), or by using a tube 2 of an outside diameter approximately equal to the inside diameter of tube 7. In either event, it is useful to have a flange or stop 29 fixed to arm 2 to limit the extent to which arm 2 may enter upright frame portion 7.

The mounting means shown will permit arm 2 to be pivotally rotated relative to frame 27. Thus, camera 4, supported by arm 2, may be rotated from a position in front of the face of the user when it is desired to use the camera and to one side out of the way when the camera is not in use. As can be seen, arm 2 is so dimensioned as to pass above and about the head of the wearer and to hold the camera at the proper level for use.

A camera-supporting bracket 35 is provided for supporting the camera at the other, front end of arm 2. This bracket can be a separate unit secured to arm 2, and adjustable if desired, but, preferably, is simply an extension of arm 2 which has been crimped to be flat, bent so it is perpendicular to the end of arm 2, and drilled to accept a standard camera mounting screw 37. Screw 37 secures the handle of the camera 39 to the end of the arm. An adjustable universal mount may be positioned between bracket 35 and the camera handle, if desired.

The tape recorder mounting bracket 3 is made by securing two vertical bars 41 and 43 between the lower pair of crosspieces 11. Bars 41 and 43 each include keyhole slots 45 and 47 located at the top and bottom of brackets 41 and 43 respectively. Tape deck 5 carries corresponding flanged studs 49 which fit into slots 45 and 47. Tape recorder 5 is secured in position by inserting studs 49 at the large open portion at the top of slots 45 and 47 and pressing the unit downwardly. Preferably, the studs and slots have a friction fit. Alternatively, locking means may be used to hold the studs in the slots.

To use the system the operator first mounts the video tape recorder on the mounting bracket by inserting the studs 49 which are mounted on the recorder into slots 45 and 47. The camera is then screwed to mounting bracket 35 on arm 2 with its lead 6 passing from camera 4 to tape recorder 5. The operator then puts on the frame by putting his arms through straps 19 and 21 and securing belt 22 around his waist. (Sometimes the unit can be used with one strap or even the belt alone. This results from the balance achieved by use of the cantilevered structure and the abovementioned positioning of the center of gravity.) The camera can then be swung into position in front of the operator's face for use or moved to one side by having the arm 2 pivot within tubular frame 7 at the point of juncture. The fit between arm 2 and frame 7 should be sufficiently loose to allow pivotal rotation but sufficiently snug to serve to hold arm 2 in the position by friction.

The controls of the recording tape deck are accessible to the operator and his assistant. After setting the deck in a standby position, the recording process can be started by simply pulling the trigger on the camera handle. If the operator wishes to view a sequence, he may rewind the video tape and play back the recording using the camera viewfinder as a monitor; and the supporting system itself need not be removed from the operator's back. Individual tapes may be placed in the tape recording deck and removed by an assistant without removing the deck from the frame, or removing the frame from the operator.

Additional space available on the frame may be used for the mounting of additional battery packs, microphone mixers or other associated peripheral equipment. If desired two camera arms can be installed, one on each of the uprights 7 and 9, for multiple camera work, or one of two arms may carry a microphone.

The use of the contoured pack frame assures the mose efficient distribution of weight so that persons can carry the entire assembly without fatigue. The camera support arm allows motion of the body to aim and steady the camera if desired, leaving the hands completely free. The camera may be swung aside when not in use, but can quickly be returned to picture-taking position when desired.

We claim:

1. A device for supporting units such as cameras, video cameras and auxiliary equipment, and the like on a person for mobility of use and ease of carrying, comprising:

a back frame and at least one strap for securing said frame to a wearer, a substantially arcuate cantilevered arm pivotally secured to said frame and dimensioned to pass from said frame upwardly and about the head of the wearer to a position to support a unit thereon proximate to the wearer's face, pivotal means securing one end of said arm to said frame for rotational movement of said arm and means at the other end of said arm for removably securing said unit to said arm, said arm and frame being so dimensioned as to distribute the weight of the unit supported via said arm directly to said back frame and thence to the body of the wearer so as to locate the center of gravity of the support device and unit supported substantially over the body of the wearer to balance thereon, whereby said frame and said arm support the unit on the wearer leaving the wearer's hands free and said arm may be selectively rotated between a position proximate the wearer's face for use and various positions to one side for additional use and non-use conditions.

2. The device of claim 1 including means secured to said frame for removably securing auxiliary equipment, such as a tape recorder, to said frame.

3. The device of claim 1 in which said cantilevered arm is dimensioned to pass over the head of the wearer.

4. The device of claim 1 in which the pivotal means securing one end of said arm to said frame include an upright on said frame, said upright and said cantilevered arm being tubular in cross-section and being telescopically interengaged with one about the other, said engagement being loose enough to permit pivotal rotation and snug enough to hold the arm in the position in which it is set.

5. In a device as set forth in claim 1 in which said supported unit is a video camera which has auxiliary equipment such as a tape recorder associated therewith, the additional improvement comprising means on said frame adapted to receive said auxiliary equipment and hold same in a position such that tape reels may be replaced without removing said tape recorder from said frame, and said structure being so dimensioned as to balance on the wearer while carrying said camera and equipment.

* * * * *